United States Patent Office 2,887,383
Patented May 19, 1959

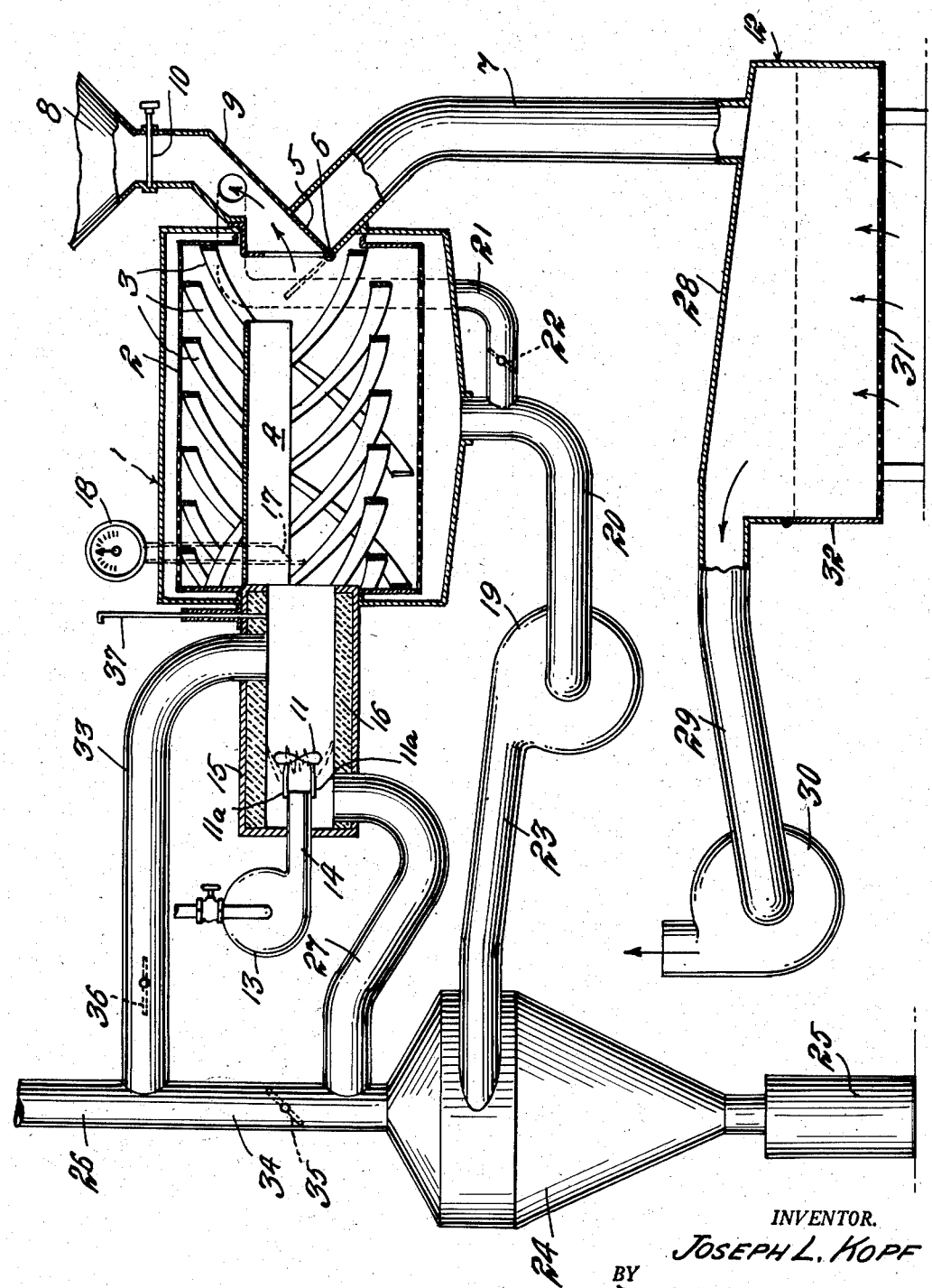
INVENTOR.
JOSEPH L. KOPF
BY
Frank A. Bower
ATTORNEY

2,887,383

METHOD OF ROASTING

Joseph L. Kopf, Maplewood, N.J., assignor to Jabez Burns & Sons, Inc., New York, N.Y., a corporation of New York Original application August 18, 1950, Serial No. 180,175. Divided and this application May 25, 1956, Serial No. 587,271

5 Claims. (Cl. 99—68)

This invention relates to an improved method and apparatus for roasting coffee, cocoa beans, peanuts, cereals and similar products and is an improvement over the disclosures of United States Patent No. 1,991,190, granted February 12, 1935, to L. H. Backer et al. This application is a division of my copending application Serial No. 180,175, filed August 18, 1950.

The main object is to burn up the smoke particles and foreign material given off during the roasting and to eliminate odors so that the discharge to the atmosphere is odorless, clean and invisible and contains no elements or substances which would contaminate the atmosphere. This is of great importance as it overcomes the smoke and odor nuisance in the neighborhood of a roasting plant and thereby avoids complaints and increases the desirability and value of surrounding property. A further object is to accomplish this without the use of any special auxiliary apparatus, thus avoiding the extra cost thereof and the space occupied thereby. Another object is to eliminate smoke particles and foreign material from the heated gases which pass over and through the materials to be roasted. This improves the flavor, development and appearance of the final product. A further object is to shorten the time required in the roasting operation. Other objects are to avoid the risk of scorching or spotting of the roast and to reduce the cost of roasting. Other objects and advantages will be understood from the following description and accompanying drawing showing a preferred embodiment of the invention.

The drawing is a side view of the apparatus, partly in section and discloses the means whereby the method may be performed.

The said prior Patent 1,991,190 discloses and explains the advantages thereof over prior methods and such advantages are attained by the present invention with the additional advantages above referred to.

Referring to the accompanying drawing a roaster casing 1 encloses the roasting chamber. A rotatable perforated cylinder or carrier 2 driven by a motor (not shown) serves to contain the material to be roasted. A plurality of mixing vanes 3 secured within the cylinder 2 serve to mix the material and carry it from the lower portion of the cylinder to the top portion and to constantly agitate it during roasting. Within the central portion of the cylinder and supported by the rear head of the casing 1 is an elongated peaked hood or spreader 4, the peak being uppermost. The vanes 3 lift the material and drop it on the hood which serves to spread the material.

A swing gate 5 is pivoted at 6 to the front head of the casing. When this gate is swung forward, as shown in the drawing, it covers the discharge chute 7 and permits raw material to be fed from the hopper 8 through the feed pipe 9 into the cylinder 2, the flow of material being controlled by the slidable feed gate 10. When the gate 5 is swung backwardly to the position shown in dotted lines, it acts as an outlet for passing the material through the discharge chute 7 into the cooler box 12 for cooling as later described.

The heating and smoke consumer may be a flame, or an incandescent body which may be heated electrically, or may be a highly heated atmosphere supplied by any suitable means. In the present instance a flame is utilized, being produced in this instance by a motor driven blower 13 arranged to premix gas with a proper volume of air for most efficient combustion and discharge the mixture through a nozzle 14 disposed in the combustion chamber formed by the casing 15. The casing 15 is shown as having an inner liner 16 of fire clay or other refractory or heat resisting material and is connected to the rear end of the cylinder 2 beneath the hood 4. Opposite the nozzle 14 are vanes 11 extending outwardly and at an angle for diffusing the flame throughout the chamber for insuring complete combustion of the smoke and other particles. The vanes or blades of this spreader are supported in fixed position from the end of the nozzle by rods 11a. A thermocouple 17 is mounted beneath the hood 4 near the combustion chamber and is connected to a dial 18 for the purpose of indicating the temperature of the heating medium as it enters the roasting cylinder.

An exhaust fan 19 is connected to the lower portion of the roasting casing by a suction pipe 20. A branch suction pipe 21 having a damper 22 is connected to the feed pipe 9. The outlet pipe 23 from the fan 19 is connected to a separator 24 of any suitable type for removing chaff and light trash which fall into a receptacle 25. The top of the separator opens into a discharge or bleeder pipe 26 which leads to the atmosphere, and to a return pipe 27 which is connected to the combustion chamber adjacent the burner nozzle.

The cooler box 12 is shown as having a hood 28 and a pipe 29 connected to a suction fan 30 which draws air upward through the perforated bottom wall 31 of the cooler. The material after cooling is discharged from the cooler through a door 32.

The foregoing description corresponds generally to the disclosures of the apparatus in said prior Patent No. 1,991,190. The present improvements in the method and apparatus will appear from the following.

A pipe 33 is connected from the top of the end portion or exit of the combustion casing, which is near the roasting chamber, to the bleeder pipe 26 and to the pipe portion 34 which leads from the recirculating pipe connections to atmosphere. A damper 35 is located in the pipe portion 34 between the outlets to pipes 27 and 33. Another damper 36 is provided in the pipe connection 33 and another damper 37, shown slidable, is located at the end of the combustion casing between the pipe connection 33 and the roasting casing.

In the prior Patent 1,991,190, a special auxiliary smoke burner is disclosed located in the bleeder pipe for reducing the smoke nuisance in the atmosphere. This involves extra cost and space occupied and such a burner to be at all effective and durable would have to be lined with refractory material. The present improved apparatus and method of control avoid the need of any auxiliary device by consuming the smoke and foreign particles in the combustion chamber of the roaster. This thus serves not only to provide heat for the roast but also to eliminate smoke and odors from the discharge to atmosphere. The character of the roast is greatly improved in quality and flavor and in appearance because the smoke and other combustible particles are more effectively eliminated from the roasting chamber.

The three dampers 35, 36 and 37 are operated in proper relation for obtaining the most advantageous method of control. In such operation at the beginning of the roast, the damper 36 in the passage 33 is closed and the dampers 35 and 37 are open. The heated gases then pass from the combustion chamber through the material in the roasting chamber, then through the separator and through the connection 27 to the combination chamber and so on in the recirculating system. The excess gases pass through the open damper 35 to bleed off to the atmosphere. During this condition of operation, no smoke or vapors from the roast are formed as the heating up of the roast continues to the proper roasting temperature. A considerable saving in heat units is thereby obtained because nearly all of the heat is then absorbed into the roast. This preheating in this step of the method usually takes about four minutes for a normal load of coffee beans and with a proper temperature of the heating gases.

When smoke and vapors begin to be given off from the roast, the damper 36 is opened and the damper 35 is closed, the damper 37 remaining open. The heated gases from the combustion chamber then pass through the material, then through the separator and, as the damper 35 is closed, the recirculation is continued through the connection 27 to the combustion chamber. The stream returned to the combustion chamber contains smoke particles, vapors, odors and various other particles not removed by the separator and these are consumed in the combustion chamber as the source of heat in this chamber is maintained sufficiently high to burn up all such particles. A minor portion of the stream passes out through the connection 33 to the bleeder pipe 26 free from smoke and odors in a clear, clean and non-visible stream and thus does not contaminate the atmosphere. The major portion of the stream passes to the roasting chamber in its recirculating path and as this portion is cleaned of smoke and other combustible particles, it improves the flavor and appearance of the roast over less efficient cleaning of the hot gases. This method of control thus avoids any auxiliary smoke eliminating device and is highly effective in purifying the gas stream to the roast and to the atmosphere.

The end point at which the proper roasting of coffee, for example, is completed, is quite critical and when reached should be stopped quickly. This is commonly accomplished by extinguishing the fuel supply, checking the roast with a spray of water and discharging the roasted material into the cooler box, the fumes and vapors being passed to the atmosphere. This serves to contaminate the atmosphere. By the present improvement the fuel supply is not shut off, the damper 37 is closed, the damper 36 remains open and the damper 35 continues to be closed. The roast is then sprayed with water within the roasting chamber for quickly checking the roasting. The smoke, odors and vapors are then drawn by the exhaust fan 19 and passed through the cleaner and then through the connection 27 to the combustion chamber. Here all the water and other vapors are heated to a high temperature. All the stream is then passed through the connection 33 and out through the bleeder pipe to atmosphere. This discharge to atmosphere is smokeless and odorless. It is also invisible because the vapors, especially the water vapor, are at such a high temperature that they do not condense to a visible mist. By this method not only is the roast quickly cooled at the critical time but the discharge to the atmosphere is in no way objectionable. After sufficient quenching and cooling, the roasted material is discharged to the cooler box for further cooling.

The roasting chamber may then be reloaded and the foregoing described method or cycle of operations repeated.

Although more heat units are required in the combustion chamber to burn up the smoke and other particles and also to roast the material than to merely roast the material, this improvement is more efficient and economical than prior methods and the total time for roasting is shortened, due considerably to the rapid heating up step in starting the roast. This shortened time of roasting, of course, increases the capacity of a roasting plant.

In some cases the separator may be omitted from the recirculating system. Likewise the cooler box may not be required. Also the first step of heating up the roast in the manner described may not be employed, although it is highly advantageous. Also the method of quenching the roast in the combustion chamber for quickly terminating the roasting period and for burning up the combustible matter with a clean and clear discharge to the atmosphere may not always be utilized, although it is highly preferable.

Although a preferred method and general form of apparatus have been described various modifications may be made without departing from the scope of the invention.

I claim:

1. The method of roasting material of the group consisting of coffee, cocoa beans, peanuts and cereals which comprises withdrawing hot smoke-laden gases from the material while under roasting conditions and subjecting said withdrawn and smoke-laden gases to combustion at high temperature substantially freeing them of smoke and other particles, then passing said gases in purified form for return flow to said roasting operation and automatically diverting a portion of said purified gas flow to a discharge to atmosphere in relative amount as determined by the then roasting conditions at said material and simultaneously recirculating the remaining undiverted portion of said purified gases through said roasting material for further roasting at said high temperature, and repeating said withdrawal and combustion and automatic proportionate diversion and return of the purified gases to completion of the roasting operation.

2. The method of roasting materials as set forth in claim 1 and including the prior heating up steps of passing heated gases through the material to be roasted during a heating up period of the material, withdrawing the gases from the material, passing a minor portion of said withdrawn gases to atmosphere whereby to remove excess gas and reheating a major portion of said withdrawn gases and recirculating said major portion through said material and continuing the heating up period until smoke and vapor are given off.

3. The method of roasting materials as set forth in claim 1 and including the subsequent cooling steps of discontinuing the passing of the heated gases through the material, quenching the material with water, subjecting the gases and vapors resulting from the quenched material to combustion to remove smoke and odor, and passing the smokeless and odorless gases and vapors to atmosphere.

4. The method of roating materials as set forth in claim 2 and including the cooling steps subsequent to the roasting period of quenching the material with water after the roasting is completed, subjecting the gases and vapors resulting from the quenched material to combustion to remove smoke and vapor, and passing the smokeless and odorless gases and vapors to atmosphere.

5. The method of roasting materials as set forth in claim 1 and including a removal of chaff and any light trash present in the gases withdrawn from the roasting chamber before the subjecting of the said withdrawn gases to the combustion at high temperature and subsequent steps in the recirculation.

References Cited in the file of this patent

UNITED STATES PATENTS

| | | |
|---|---|---|
| 1,547,655 | Johnson | July 28, 1925 |
| 1,991,190 | Backer et al. | Feb. 12, 1935 |
| 2,292,255 | Weisberg | Aug. 4, 1942 |
| 2,769,504 | Miller | Nov. 6, 1956 |